United States Patent Office 3,542,787
Patented Nov. 24, 1970

3,542,787
10,11-DIHYDRO-5,10-(IMINOMETHANO)-5H-DI-BENZO[a,d]CYCLOHEPTEN-13-IMINE
Thomas A. Dobson, St. Laurent, Montreal, Quebec, and Martin A. Davis, Montreal, Quebec, Canada, assignors to American Home Products Corporation, New York, N.Y., a corporation of Delaware
No Drawing. Filed June 25, 1968, Ser. No. 739,635
Int. Cl. C07
U.S. Cl. 260—286                                5 Claims

ABSTRACT OF THE DISCLOSURE

There is disclosed herein 10,11-dihydro-5,10-(iminomethano)-5H-dibenzo[a,d]cyclohepten-13-imine, and its hydrochloride salt as well as a process of preparation. The compound has hypotensive properties and methods for its use are also disclosed.

---

This invention relates to a novel chemical compound having useful biological properties. In particular, this invention relates to 10,11 - dihydro-5,10-(iminomethano)-5H-dibenzo[a,d]cyclohepten-13-imine of Formula I.

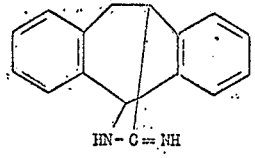

This invention also comprises the acid addition salts of the compound of Formula I with pharmaceutically acceptable acids such as, for example, sulfuric, hydrochloric, oxalic, maleic, citric, or tartaric acids.

The new and novel 10,11 - dihydro - 5,10 - (iminomethano)-5H-dibenzo[a,d]cyclohepten - 13-imine of this invention has been found to possess interesting pharmacological properties. More particularly, this compound in a standard pharmacological test especially in a modification of the test for determining hypotensive activity described in "Screening Methods in Pharmacology," Academic Press, New York and London 1965, p. 146, using the cat in urethane-chlorolose anaesthesia as the test animal and measuring mean arterial blood pressure before and after intravenous administration of the compound, has exhibited utility as a hypotensive agent. When the compound of this invention is employed as a hypotensive agent in warm-blooded animals, for example, in cats alone or in combination with pharmacologically acceptable carriers its proportion is determined by its solubility, by the chosen route of administration, and by standard biological practice. For example, the compound of this invention is preferably administered parenterally in the form of a sterile solution thereof which may also contain other solutes, for example, sufficient sodium chloride or glucose to make the solution isotonic.

The dosage of the present therapeutic agent will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compound of this invention is most desirably administered at a concentration level that will generally afford effective results without causing any harmful or deleterious side effects and preferably at a level that is in a range of from about 0.5 mg. to about 5.0 mg. per kilo, although as aforementioned variations will occur. However, a dosage level that is in range of from about 2 mg. to about 4 mg. per kilo is most desirably employed in order to achieve effective results.

The compound of this invention is prepared in the following manner. Thus, 10 - bromo-5H-dibenzo[a,d]cyclohepten-5-one is treated with cuprous cyanide in a conventional manner to give 10 - cyano-5H-dibenzo[a,d]cyclohepten-5-one (II). In its turn, this compound is treated with formamide in a conventional manner to give 5- formamido - 5H - dibenzo[a,d]cycloheptene-10-carbonitrile (III). In its turn, this compound is treated with a complex alkali metal borohydride in a suitable solvent to give the compound of Formula I.

More specifically, a mixture of 10-bromo-5H-dibenzo[a,d]cyclohepten-5-one and a molar excess of cuprous cyanide optionally diluted with quinoline is kept at a temperature within the range of 150–220° C. for a period of 0.5–3 hours. The reaction mixture is partitioned between a suitable water immiscible solvent and an aqueous mineral acid. Evaporation of the solvent phase leaves 10-cyano-5H-dibenzo[a,d]cyclohepten-5-one.

In its turn a mixture of this compound and a molar excess of formamide optionally containing up to 10% of carboxylic acid such as, for example, formic acid or acetic acid is kept at a temperature within the range of 100–150° C. for a period of 0.5–6 hours. The mixture is cooled and diluted with water whereupon 5-formamido-5H-dibenzo[a,d]cycloheptene-10-carbonitrile is precipitated.

In its turn this compound is dissolved in a lower alkanol containing from 1–4 carbon atoms and treating with a molar excess of lithium or sodium or potassium borohydride at a temperature within the range of 20–100° C. for a period of between 1–24 hours. The mixture is diluted with water whereupon 10,11 - dihydro - 5,10 - (iminomethano)-5H-dibenzo[a,d]cyclohepten-13-imine of Formula I is precipitated.

The aforementioned acid addition salts of the compound of Formula I are prepared by treating a solution of the compound of Formula I in a suitable solvent such as, for example, a lower alkanol containing from 1–4 carbon atoms or a dialkyl ether containing from 4–8 carbon atoms with a solution of the appropriate acid in a suitable solvent such as, for example, a lower alkanol containing from 1–4 carbon atoms or a dialkyl ether containing from 4–8 carbon atoms.

The starting material for the compounds of this invention, that is 10-bromo-5H-dibenzo[a,d]cyclohepten-5-one is prepared as described by W. Treibs and H. J. Klinkhammer, Chem. Ber., 84, 671-9 (1951).

The following formulae and examples will illustrate this invention.

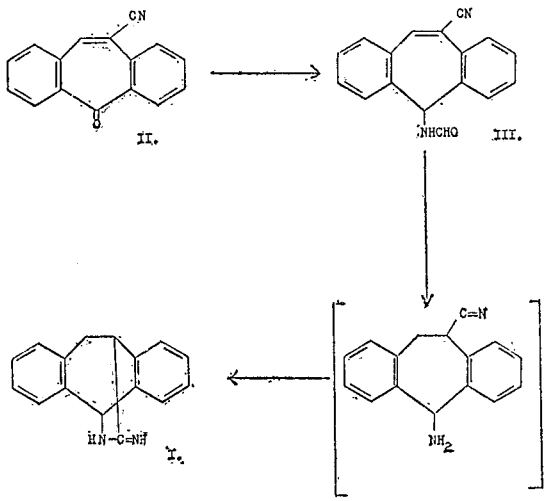

EXAMPLE 1

10-cyano-5H-dibenzo[a,d]cyclohepten-5-one

A mixture of 11-bromo-5H-dibenzo[a,d]cyclohepten-5-one (99.0 g.), cuprous cyanide (40 g.) and quinoline (200 ml.) is stirred and heated at 190–200° C. (internal temperature) for one hour. The mixture is cooled and the resulting solid mass is broken up and stirred under ether. The mixture is filtered and the solids are washed with ether. The remaining solids are triturated under chloroform. This mixture is filtered and the solids are washed with hot chloroform. The green insoluble residue is discarded.

The ether filtrate and washings are exhaustively washed with 2 N HCl, then water, and then dried and evaporated. The chloroform filtrate and washings are similarly processed.

The solid residue so obtained are combined and recrystallized from ethanol to give the title product, M.P. 170–173° C.

The title product is further characterized by its infrared spectrum with maxima at 2230 and 1645 cm.$^{-1}$.

The title product is also obtained when the above procedure is carried out in the absence of quinoline.

EXAMPLE 2

5-formamido-5H-dibenzo[a,d]cycloheptene-10-carbonitrile

A mixture of 10-cyano-5H-dibenzo[a,d]cyclohepten-5-one (3.3 g.), prepared as described in Example 1, formamide (16 ml.) and acetic acid (1.6 ml.) is heated under reflux for one hour. The mixture is cooled and poured into water. The precipitate is collected and recrystallized from ethanol to give the title product, M.P. 204–206° C.

EXAMPLE 3

10,11-dihydro-5,10-(iminomethano)-5H-dibenzo[a,d]cyclohepten-13-imine

A mixture of sodium borohydride (15.0 g.), 5-formamido - 5H - dibenzo[a,d]cycloheptene-10-carbonitrile (15.0 g.), prepared as described in Example 2, and ethanol (400 ml.) is stirred and heated under reflux for 8 hours. The mixture is diluted with water and the ethanol is removed in vacuo. The solids are collected and crystallized from ethanol to give the title product, M.P. 241–243° C.

The hydrochloric acid addition salt of the title product is prepared by treating a solution of the title product in methanol with a methanolic solution of hydrogen chloride. It is crystallized from ethanol to M.P. greater than 260° C.

We claim:
1. A compound selected from the group which consists of 10,11-dihydro-5,10-(iminomethano)-5H-dibenzo[a,d]cyclohepten-13-imine and acid addition salts thereof with pharmaceutically acceptable acids.
2. A compound as defined in claim 1 which is: 10,11-dihydro - 5,10 - (iminomethano) - 5H-dibenzo[a,d]cyclohepten-13-imine.
3. A compound as defined in claim 1 which is: the hydrochloric acid addition salt of 10,11-dihydro-5,10-(iminomethano)-5H-dibenzo[a,d]cyclohepten-13-imine.
4. The process of preparing 10,11-dihydro-5,10-(iminomethano) - 5H - dibenzo[a,d]cyclohepten - 13-imine which comprises converting 10-bromo-5H-dibenzo[a,d]cyclohepten - 5 - one to 10-cyano-5H-dibenzo[a,d]cyclohepten-5-one by treating said first-named compound with a metal cyanide; treating said 10-cyano-5H-dibenzo[a,d]cyclohepten-5-one with formamide at an elevated temperature above room temperature, thereby securing 5-formamido - 5H - dibenzo[a,d]cycloheptene - 10 - carbonitrile; and treating said last-named compound with a complex alkali metal borohydride in a lower alkanol, followed by diluting said reaction mixture by adding water thereto, thereby securing 10,11-dihydro-5,10-(iminomethano)-5H-dibenzo[a,d]cyclohepten-13-imine.
5. A process as defined in claim 4 wherein said 10,11-dihydro - 5,10 - (iminomethano) - 5H-dibenzo[a,d]cyclohepten-13-imine is treated with a methanolic solution of hydrogen chloride, thereby obtaining the hydrochloric acid addition salt thereof.

References Cited
UNITED STATES PATENTS

| | | | |
|---|---|---|---|
| 3,412,085 | 11/1968 | Dobson et al. | 260—288 X |
| 3,458,518 | 7/1969 | Dobson et al. | 260—286 |
| 3,466,288 | 9/1969 | Hansen et al. | 260—286 |

DONALD G. DAUS, Primary Examiner

U.S. Cl. X.R.

260—28, 465, 591; 424—258